United States Patent [19]

Nguyen et al.

[11] Patent Number: 4,938,731
[45] Date of Patent: Jul. 3, 1990

[54] ROTATABLE, SELF-ALIGNING LOBE COUPLING

[75] Inventors: Phuson Nguyen, North Hollywood; Robert E. Matijick, Alhambra, both of Calif.

[73] Assignee: Barry Wright Corporation, Watertown, Mass.

[21] Appl. No.: 307,734

[22] Filed: Feb. 7, 1989

[51] Int. Cl.$^5$ .............................................. F16D 3/18
[52] U.S. Cl. ...................................... 464/158; 81/460; 403/14; 403/359; 464/901
[58] Field of Search ............... 81/121.1, 460; 403/13, 403/14, 359; 464/157, 158, 159, 901

[56] References Cited

U.S. PATENT DOCUMENTS

| | | | |
|---|---|---|---|
| 2,083,092 | 6/1937 | Richer | 81/460 X |
| 2,926,034 | 2/1960 | Weaver | 403/359 X |
| 3,290,918 | 12/1966 | Weasler | 403/359 X |
| 3,542,178 | 11/1970 | Ripple | 464/901 X |
| 3,584,667 | 6/1971 | Reiland | 81/460 |
| 4,540,305 | 9/1985 | Geisthoff et al. | 464/901 X |
| 4,575,356 | 3/1986 | Murohushi et al. | 464/901 X |
| 4,616,535 | 10/1985 | Chiavon | 81/121.1 |
| 4,824,418 | 4/1989 | Taubert | 464/159 |

FOREIGN PATENT DOCUMENTS 20665  1/1883  Fed. Rep. of Germany ...... 464/158

Primary Examiner—Daniel P. Stodola
Attorney, Agent, or Firm—Hamilton, Brook, Smith & Reynolds

[57] ABSTRACT

A rotatable coupling having a male member (2) and a female member (4) each rotatable about central axes $\alpha$ and $\beta$. The male member has lobes (16) and the female member cavities (50) for mutual engagement. The male lobes terminate in wedge-shaped portions (18), the edges of which lie in a common plane. The female terminates in a flat bottom surface (40).

13 Claims, 3 Drawing Sheets

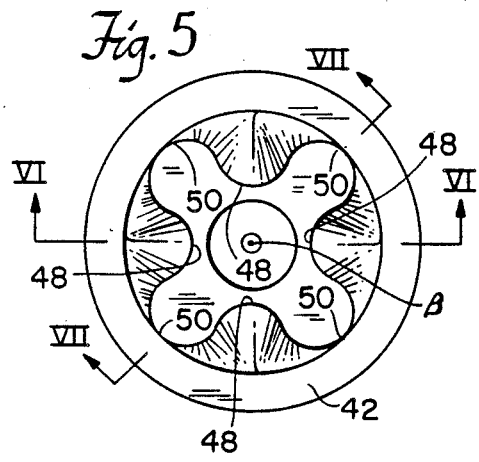
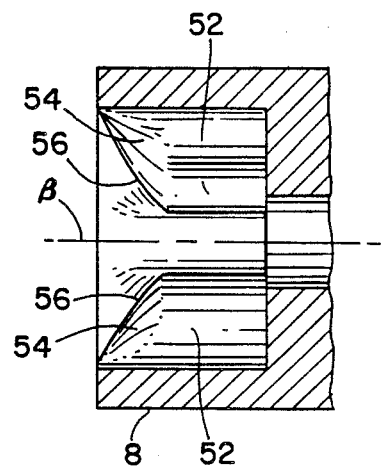
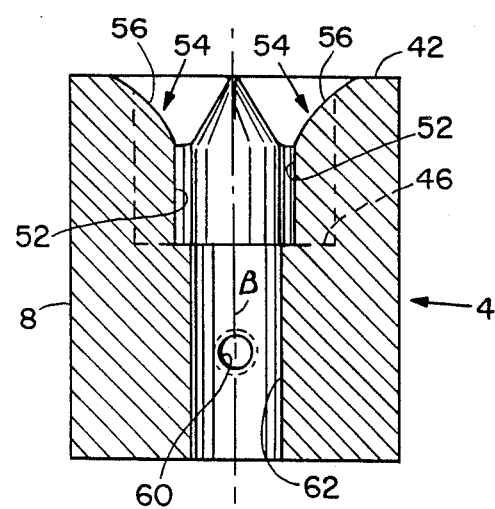
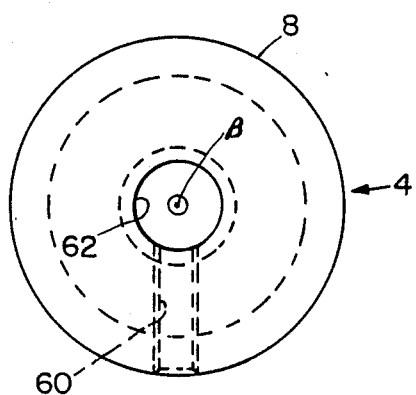

ROTATABLE, SELF-ALIGNING LOBE COUPLING

FIELD OF THE INVENTION

This invention relates to rotatable couplings in general and, more particularly, to couplings having a driving and a driven member which are self-aligning, self-orienting and which have applicability in fields varying from power transmission to fasteners.

BACKGROUND OF THE INVENTION

The prior art is replete with coupling devices which may be employed for power transmission, both permanently engaged and also releasably engageable. Likewise, there are numerous "couplings" in the fastener art. A blade or a Phillips Screwdriver engaging and rotating a screw is also a "coupling" within the meaning of this application. It is one of the objects of this invention to provide a rotatable coupling applicable to all phases of transmission of rotary motion.

One of the problems encountered with disengageable rotatable couplings is the necessity of aligning the driving member with the driven member prior to actually rotating the driver. For example, the common lag bolt or other fastener having a hexagonal head is frequently driven by a driving socket having a mating hexagonal cavity. Often, the socket is operated by a ratcheted socket wrench. However, before actually rotating the hexagonal socket, its corners must be aligned precisely with the corners of the hexagonal head of the bolt in order to slide the socket over the head.

Similarly, the axis of rotation of a driving socket must also be substantially aligned with the axis of rotation of the driven member. Again, using the example of the lag bolt, the socket will not fit over the head of the bolt if their axes are not aligned. Not only must the alignment be such that the axes are co-linear, i.e., not displaced laterally, even though parallel, but the axes must also not be angularly misaligned.

It is, accordingly, another object of this invention to provide a coupling member wherein the driving and driven members may be slightly out of axial alignment, both in displacement and angularity, and still be capable of attaining mating driving engagement while aligning themselves.

It is also an object of this invention that the rotatable coupling have utility as flexible couplings rotary transfer joints, torque transfer joints and specialty fasteners, just to mention a few.

With the versatility contemplated for the subject invention, it could be incorporated into a robotic gripper for torque transfer due to its unique self-aligning nature. It would also have utility in tool changing linkage. It would allow robotic installation of fasteners since the driver and driven member are self-aligning.

It is contemplated that the coupling include male and female components, the male being essentially a bit with external lobes and the female having internal receiving chambers formed to receive the lobes. It is intended that these members be symmetrical to effect driving in both a clockwise and counter-clockwise direction.

It is intended that the bit employ conical or wedge-shaped entry surfaces with mating conical or wedge-shaped surfaces on the female member so that the cones or wedges slide upon one other, even though they are initially out of alignment.

SUMMARY OF THE INVENTION

The invention resides in a rotatable coupling which includes a male coupling member and a female coupling member. The male member includes a first hub which has a central axis of rotation. A bit projects from the hub and is formed by a continuous wall which defines a plurality of first lobes equidistantly spaced around the axis. Each of the lobes has a curvilinear portion adjacent the hub and a cone-like or wedge-shaped portion which projects from the curvilinear portion and terminates in a leading edge radiating outwardly from the central axis. The edges are joined at the central axis and lie in a common plane which is normal to the axis.

The female member is rotatably engageable with the male member and includes a second hub, also having a central axis of rotation. A receiving cavity is formed in one face of the second hub and is defined by a continuous wall which terminates in an interior bottom surface within the hub.

The cavity in the female member is further defined by a plurality of second lobes equidistantly spaced around the wall and which extend radially inwardly toward the central axis. The second lobes define receiving chambers between them, symmetrical with the first lobes and of a size only slightly larger than the first lobes on the male member to receive them in driving relationship.

Each of the second lobes has a curvilinear portion adjacent the bottom surface and a cone-shaped or wedge-shaped portion which projects from the curvilinear portion. The wedge-shaped portions terminate in edges which radiate inwardly from the wall toward the central axis of the female hub and is inclined from the face of the hub toward the interior bottom surface.

The male member is engageable in the female member regardless of the rotational orientation of the first and second lobes. Any given pair of corresponding lobes and chambers may be oriented, rotationally, 45° from the opposite member and engagement of the male and female members will still take place because of the wedge-shaped portions, which initially act as orienting means.

Engagement occurs as the wedge-shaped surfaces of the male and female members engage and cause relative rotation between the members until the male lobes enter the female receiving cavities thereby permitting the leading edges of the bit or male member move toward interior bottom surface of the female cavity.

Means may be provided to attach either or both of the male and female members to a shaft or equivalent structure.

A chamfer is formed at the outer extremity of each edge of the male member to aid in guiding. A flat is formed substantially normal to the central axis of the male member at the intersection of the leading edges which lie in the common plane.

In each of the male and female members, the lobes are convex in cross section when measured normal to their respective axis of rotation. They are joined by portions which are concave in cross section also when measured in the same direction.

The respective axes of rotation may be parallel but not aligned or intersecting and angularly misaligned. When the wedge-shaped portions first engage, relative rotation takes place so as to align the lobes with the receiving cavities as the two axes of rotation become aligned and the leading edges of the wedge-shaped portions of the male bit moves towards and ultimately may bottom against the interior bottom surface of the female cavity.

If the respective axes of rotation are slightly offset or if the axes are somewhat alignally disposed. their ultimate alignment is not impeded since the male and female members will be forced by the wedge-shaped surfaces to accommodate one another.

The above and other features of the invention, including various novel details of construction and combinations of parts, will now be more particularly described with reference to the accompanying drawings and pointed out in the claims. It will be understood that the particular coupling member embodying the invention is shown by way of illustration only and not as a limitation of the invention. The principals and features of this invention may be employed in various and numerous embodiments without departing from the scope of the invention.

BRIEF DESCRIPTION OF THE DRAWINGS

FIG. 5 is an open end view of the female rotatable coupling member.

FIG. 6 is a sectional view taken on the line VI—VI of FIG. 5.

FIG. 7 is a sectional view taken on the line VII—VII of FIG. 5.

FIG. 8 is a rear end view of the female member.

DETAILED DESCRIPTION OF THE INVENTION

Figure 1:
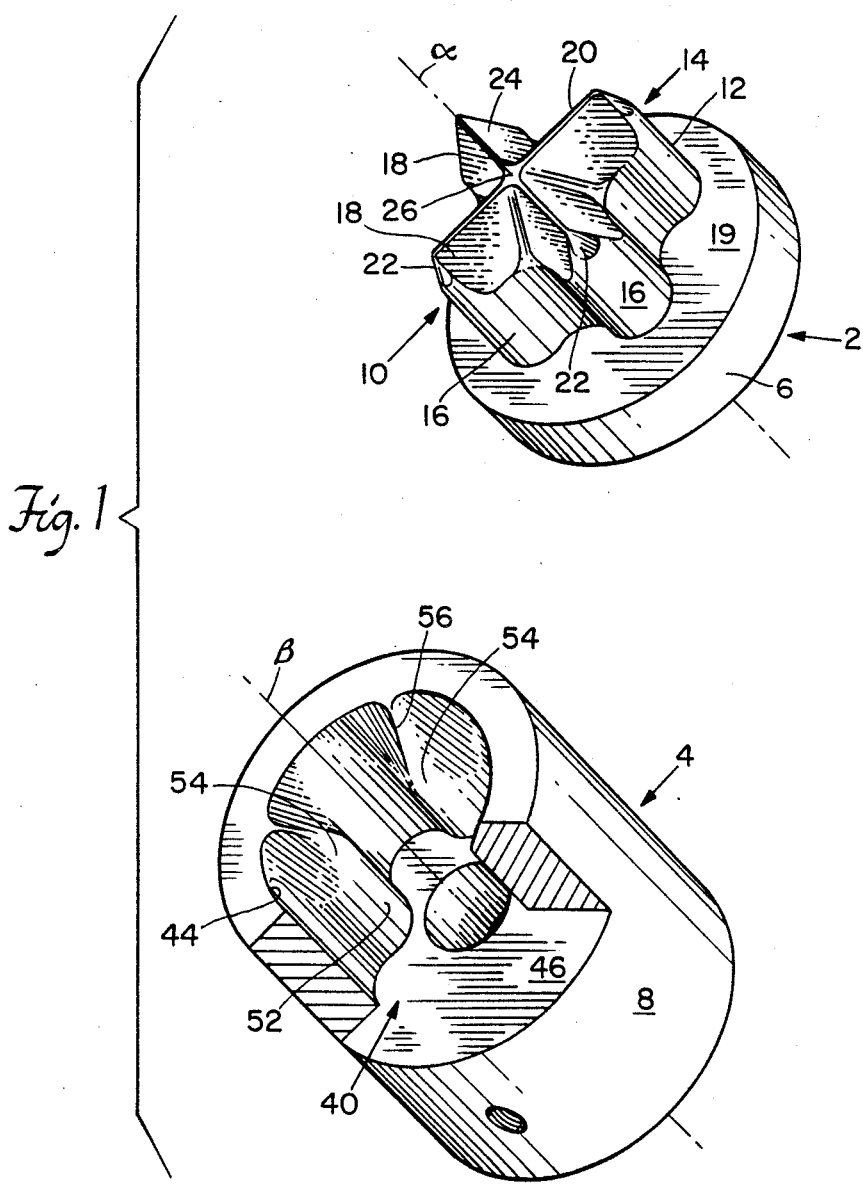
FIG. 1 is an exploded view, with part broken away, of a rotatable coupling having male and female members which coupling embodies features of the invention.

A rotatable coupling embodying features of the present invention will be seen in FIG. 1. It includes a male coupling member generally designated 2 and a female coupling member generally designated 4. The male member includes a first cylindrical hub portion 6 and the female member includes a second cylindrical hub portion 8, which is somewhat longer than the male or first hub portion 6. The male member 2 is symmetrical and rotatable about a central axis $\alpha$ and the female member 4 is also symmetrical and rotatable about a central axis $\beta$.

While both the male and female members are shown in FIG. 1 for illustration pointing upwardly and to the left of the sheet, in reality, when the female member 4 is in that orientation the male member will be pointed downwardly to the right so it may enter the female member with the axes $\alpha$ and $\beta$ more or less aligned, ultimately becoming co-axial.

Figure 2:
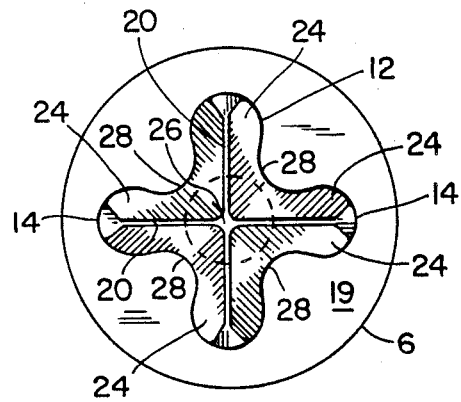
FIG. 2 is a leading end view of the male rotatable coupling member.
Figure 3:
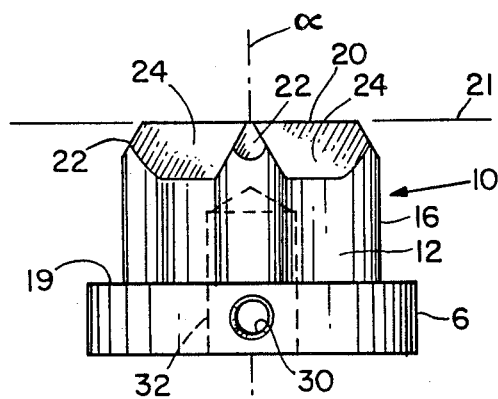
FIG. 3 is a side elevation thereof.
Figure 4:
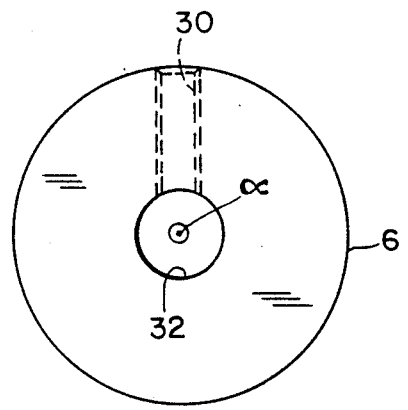
FIG. 4 is a rear view thereof.

The male coupling member will now be described with reference to FIG. 1, as well as to FIGS. 2 through 4. The male member includes a bit generally designated 10, which has a continuous wall 12, projecting from the cylindrical hub 6. The wall defines a plurality of first lobes 14, which are equidistantly spaced around the axis $\alpha$. Each lobe has a curvilinear portion 16 (FIGS. 1 and 3), which is adjacent the hub portion 6 and projects from a flat surface 19 normal to the axis $\alpha$, and a wedge-shaped portion 18. which projects from the curvilinear portion 16, and which terminates in an edge 20. Each of the edges 20 radiates from the axis $\alpha$ and they all lie in a common plane 21 (FIG. 3), which is normal to the axis $\alpha$. A chamfer 22 is formed at the outer extremity of each leading edge 20 of the wedge-shaped portions 18 which chamfers aid in the entry process. The wedge-shaped or cone-shaped portions 18 have sloping sides 24, which project downwardly from the leading edges 20 to the curvilinear portions 16 as seen in FIG. 3 the sloping sides 24 are flat and the leading edges 20 are straight. As viewed in FIG. 1, each of the wedge-shaped portions converges toward the leading edge 20 and the common plane 21 and thus away from the first hub 6. A flat 26 is formed on the bit substantially normal to the axis at the intersection of the leading edges 20 of the wedge-shaped portions 18.

The lobes 16 of the bit are convex in cross section (FIG. 2) when measured normal to the axis $\alpha$, and are joined by portions 28 which are concave also when measured normal to the axis. The bit includes means such as a tapped hole 30 for a set screw, which hole intersects a bore 32 for attaching the bit to a shaft, if desired.

The female member 4 will now be described with reference to FIG. 1 and FIGS. 5 through 8. As stated above, the female member includes the second hub 8 and is rotatable about the central axis $\beta$. A receiving cavity, generally designed 40 (FIG. 1), is formed in one face 42 of the hub 8, and is defined by a continuous wall 44 (FIG. 1), which extends from the face 42 and terminates in an interior bottom surface 46, which is normal to the axis of rotation beta. The cavity 40 in the female member 4 is further defined by a plurality of second lobes 48 (FIG. 5), which are equidistantly spaced around the wall 44, and which extend radially inwardly toward the central axis $\beta$. The second lobes 48 define receiving chambers 50 between them, as seen in FIG. 5. The chambers 50 are symmetrical with the first lobes 14 of the male member 2 and are of a size only slightly larger than the male member lobes to receive them in driving relationship.

Each of the second lobes 48 has a curvilinear portion 52 (FIGS. 1 and 7) adjacent the bottom surface 46 and a cone-shaped or wedge-shaped portion 54, which projects from the curvilinear portion 52. As seen in FIGS. 1 and 5–7 the cone-shaped or wedge-shaped portion 54 is not flat but its surfaces are convex. The wedge-shaped portions 54 terminate in edges 56 which are centrally located relative to the lobe from which they project and, which radiate inwardly from the wall 44 toward the central axis $\beta$ of the hub 8 and are inclined from the face 42 of the hub toward the interior bottom surface 46. As seen in FIGS. 5–7, the edge 56 is not straight but convex.

It will be noted that any line drawn in the curvilinear portions of the lobes 52, which is normal to the interior bottom surface 46, is parallel to the axis $\beta$ and to each other. In like manner, any line drawn in the lobes 14 of the male member, which is normal to the surface 19, is parallel to the axis $\alpha$ and to each other.

The hub 8, similar to the hub 6 of the male member has a tapped hole 60 communicating level a bore 62 for securing it to a shaft.

Because of the flat wedge-shaped portions 18 on the male member and the similar convex wedge-shaped portions 54 on the female member, when the male member is urged point wise toward the female member, regardless of the rotational orientation of the first and second lobes 14 and 52, respectively, they will be engageable, unlike the above lag bolts and driving socket. Any given pair of corresponding lobes may be oriented, rotationally, 45° from the opposite member and engagement of the male and female members 2 and 4 will still take place. When the surfaces 24 of the wedge-shaped portions 18 engage the convex surfaces 54 they are, in effect, camming surfaces which will induce relative rotation until the male lobes 14 are aligned with and slide into the female receiving chambers 50. The leading straight edges 20 of the male member, if desired, will bottom against the inner flat bottom 46 of the female member unless it is desired to prevent this whereupon the male bit will be intentionally made axially shorter than the receiving chamber of the female member. Once the male lobes 14 have entered the female receiving chambers, they are in alternating symmetrical relationship and thereby permit rotational movement to be transferred from one member to the other equally in both directions, depending upon which is employed as the driving member and which the driven.

We claim:

1. A rotatable coupling comprising:
   a male member including a first hub rotatable about a central axis;
   a bit having a continuous wall projecting from the hub and defining a plurality of first lobes equidistantly spaced around the axis;
   each lobe having a curvilinear portion adjacent the hub and a symmetrical wedge-shaped portion projecting from the curvilinear portion and terminating in a straight leading edge;
   the leading edge of each wedge-shaped portion extending radially inwardly and intersecting at the central axis and lying in a common plane normal to the axis;
   the sides of each wedge-shaped portion converging toward the leading edge and the common plane and away from the first hub so that only the leading edge portions and their intersection lie in the common plane;
   a female member including a second hub rotatable about a second central axis;
   a receiving cavity in the second hub having a second continuous wall formed from one face of the second hub and terminating in an interior flat bottom surface;
   the second wall defining a plurality of second lobes equidistantly spaced around the second axis and extending radially toward the axis, the second lobes defining receiving chambers between them;
   the bit of the male end being engageable within the cavity;
   each second lobe having a curvilinear portion adjacent the bottom surface and a symmetrical, convex, wedge-shaped portion projecting from the curvilinear portion and terminating in a curvilinear leading edge radiating inwardly from the wall toward the central axis and centrally located relative to the lobe from which it projects;
   each second lobe edge being inclined from the face of the hub toward the flat bottom surface;
   such that the male member is engageable in the female cavity regardless of the rotational orientation of the first and second lobes prior to engagement.

2. A coupling member according to claim 1 wherein a chamfer is formed at the outer extremity of each leading edge of the wedge-shaped portions of the bit.

3. A coupling member according to claim 1 wherein a flat is formed on the bit substantially normal to the axis at the intersection of the leading edges of the wedge-shaped portions of the bit.

4. A coupling member according to claim 1 wherein the lobes of both the male and female members are convex in cross section when measured normal to the respective axis and joined by portions which are concave in cross-section when measured normal to the respective axis.

5. A coupling member according to claim 1 wherein means are provided to attach the members each to a shaft.

6. A rotatable coupling member comprising:
   a male member including a first hub having a central axis;
   a bit having a continuous wall projecting from the hub and defining a plurality of first lobes equidistantly spaced around the axis;
   each lobe having a curvilinear portion adjacent the hub and a symmetrical wedge-shaped portion projecting from the curvilinear portion and terminating in a straight leading edge radiating inwardly and terminating at a common intersection on the axis;
   the leading edge of each wedge-shaped portion lying in a common plane normal to the axis such that only the leading edges and their common intersection lie in the common plane;
   the sides of each wedge-shaped portion converging toward the leading edge and the common plane and away from the first hub;
   a female member rotatably engageable with the male member and having a second hub rotatable about a second central axis;
   a receiving cavity in the second hub having a second continuous wall formed from one face of the second hub and terminating in an interior flat bottom surface;
   the second wall defining a plurality of second lobes equidistantly spaced around the wall and extending radially inwardly toward the axis, the second lobes defining receiving chambers between them;
   each second lobe having a curvilinear portion adjacent the bottom surface and a convex wedge-shaped portion projecting from the curvilinear portion and terminating in a convex leading edge radially inwardly from the wall toward the central axis and centrally located relative to the lobe from which it projects; and
   each second lobe being inclined from the face of the hub with the convex leading edge inclined toward the flat bottom interior surface;
   the bit being engageable in the receiving cavity with the first lobes of the bit engageable within the receiving chambers between the second lobes in alternating symmetrical relationship to permit rotational movement to be transmitted from one member to the other and in both directions.

7. A rotatable coupling comprising:
   a male member including a first hub having a central axis;
   a bit having a continuous wall projecting from the hub and defining a plurality of first lobes equidistantly spaced around the axis;
   each first lobe having a curvilinear portion adjacent the hub and a symmetrical wedge-shaped portion projecting from the curvilinear portion and terminating in a straight leading edge radiating inwardly and terminating at a common intersection;

each leading edge lying in a common plane normal to the axis such that only the leading edges and their intersection lie in the common plane;

the sides of each wedge-shaped portion converging toward the leading edge and the common plane and away from the first hub;

female member rotatably engageable with the male member having a second hub having a second central axis;

a receiving cavity defined by a continuous second wall formed in one face of the second hub and terminating in an interior bottom surface;

the cavity being further defined by a plurality of second lobes equidistantly spaced around the wall and extending radially inwardly toward the axis, the second lobes defining receiving chambers between them;

each second lobe having a curvilinear portion adjacent the bottom surface and a symmetrical, convex, wedge-shaped portion projecting from the curvilinear portion and terminating in a curvilinear leading edge radiating inwardly from the wall toward the central axis;

each curvilinear edge of the second lobes being inclined from the face of the hub toward the flat bottom surface and centrally located relative to the lobe from which it projects; and the wedge-shaped portions of the bit being initially engageable with the wedge-shaped portions of the receiving cavity to cause relative rotation of the male and female members as they move axially towards each other regardless of the alignment of their respective axis so as to urge the members into mating engagement with their axis aligned.

8. A male rotatable coupling member comprising:
a hub rotatable about a central axis;
a bit having by a continuous wall projecting from the hub and defining a plurality of lobes equidistantly spaced around the axis;
each lobe having a curvilinear portion adjacent the hub and a symmetrical wedge-shaped portion projecting from the curvilinear portion and terminating in a straight leading edge extending radially inwardly toward the axis;
the leading edge of each wedge-shaped portion intersecting at a common point on the axis and lying in a common plane normal to the axis; and
the sides of each wedge-shaped portion converging toward the leading edge and the common plane and away from the hub such that only the leading edges an their common intersection lie in the common plane.

9. A coupling member according to claim 8 wherein a chamfer is formed at the outer extremity of each leading edge.

10. A coupling member according to claim 8 wherein a flat is formed substantially normal to the axis at the intersection of the leading edges.

11. A coupling member according to claim 8 wherein the lobes are convex in cross section when measured normal to the axis and joined by portions which are concave in cross section when measured normal to the axis.

12. A coupling member according to claim 8 wherein means are provided to attach the member to a shaft.

13. A female rotational coupling member comprising:
a hub rotatable about a central axis;
a receiving cavity in the hub defined by a continuous wall formed from one face of the hub and terminating in an interior flat bottom surface spaced inwardly from the said one face;
the continuous wall defining a plurality of lobes equidistantly spaced around the axis and extending radially toward the axis, the lobes defining receiving chambers between them;
each lobe having a curvilinear portion adjacent the interior flat bottom surface and a convex wedge-shaped portion projecting from the curvilinear portion and terminating in a convex leading edge radiating inwardly from the wall toward the central axis and centrally located relative to the lobe from which it projects; and
each convex leading edge being inclined from the face of the hub toward the flat bottom surface.

* * * * *